UNITED STATES PATENT OFFICE.

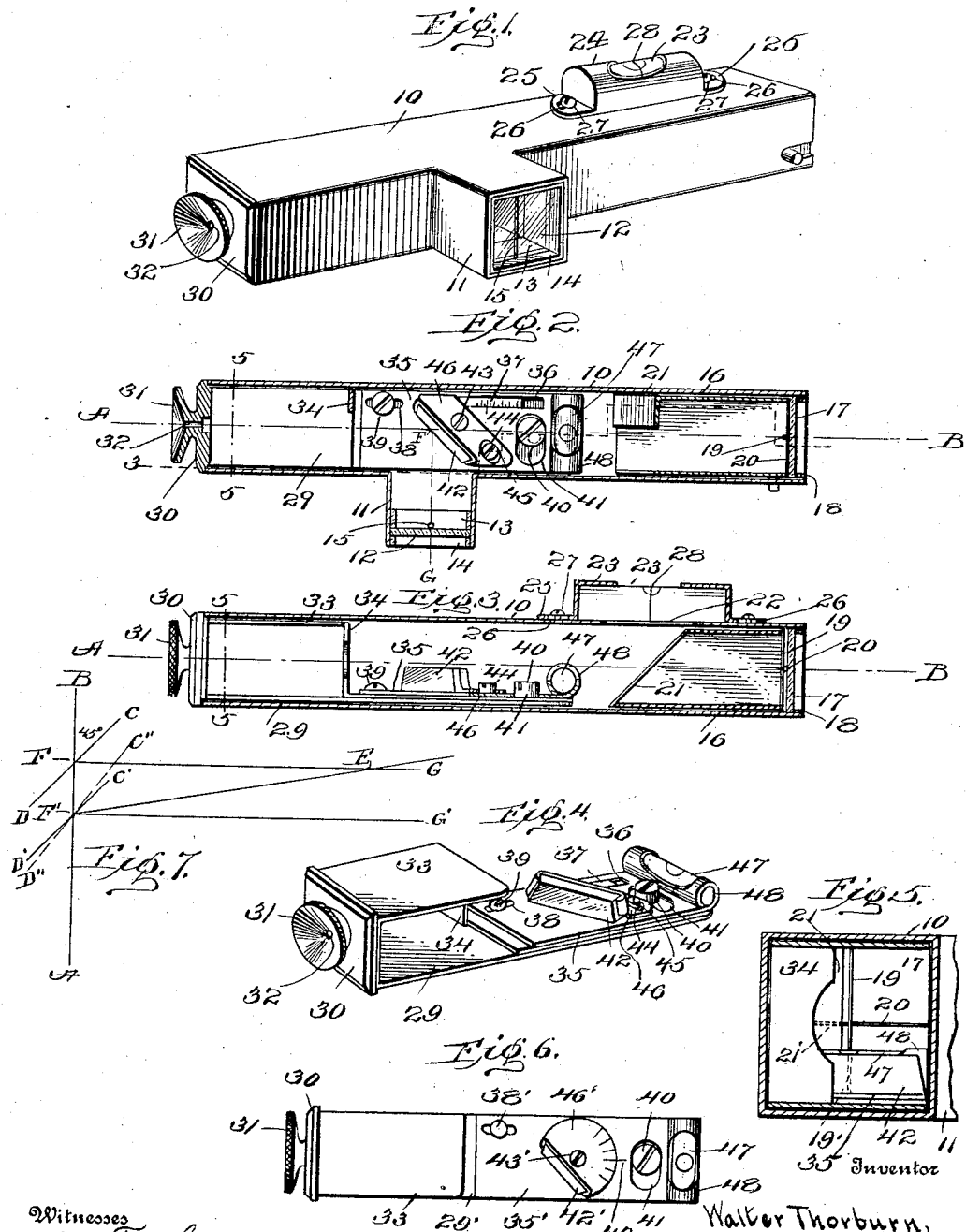

WALTER THORBURN, OF SEATTLE, WASHINGTON.

HAND-LEVEL AND TRIANGLE.

No. 857,688.  Specification of Letters Patent.  Patented June 25, 1907.

Application filed July 11, 1906. Serial No. 325,712.

*To all whom it may concern:*

Be it known that I, WALTER THORBURN, a citizen of the United States, residing at Seattle, in the county of King and State of Washington, have invented certain new and useful Improvements in Hand-Levels and Triangles; and I do hereby declare the following to be a full, clear, and exact description of the invention, such as will enable others skilled in the art to which it appertains to make and use the same.

This invention relates to instrument for leveling and projecting angles.

The object of the invention is to provide an instrument embodying a level and so arranged that a reflection from the level is cast upon a reflecting surface within the instrument in a line to coincide with the horizontal line of the object glass.

A further object of the invention is to provide an instrument having an angularly disposed reflecting surface arranged to receive rays of light from an object at one side of the instrument, the image of which will be combined with the object seen in direct line through the object glass in front.

A further object of the invention is to provide in an instrument of the class described, a reflecting surface provided with improved means for varying the angularity and position of the reflector.

A further object of the invention is to provide in an instrument of the class described a plurality of levels, one of which is arranged to determine the horizontal position of the main sight tube, and the other arranged to determine the horizontal position of the branch sight tube arranged to project an angle.

With these and other objects in view, the invention comprises certain other novel constructions, combinations and arrangements of parts, as will be hereinafter fully described and claimed.

In the drawings:—Figure 1 is a perspective view of the improved instrument. Fig. 2 is a longitudinal, sectional view of the instrument taken on a plane normally horizontal. Fig. 3 is a longitudinal, sectional view of the instrument taken on a plane at right angles to the plane of Fig. 2. Fig. 4 is a perspective view of a slide carrying the sight piece, adjustable angular reflector and one of the levels. Fig. 5 is a transverse, sectional view taken on line 5—5 of Figs. 2 and 3. Fig. 6 is a top plan view of the removable slide showing a slightly modified manner of adjusting the angular reflector. Fig. 7 is a diagrammatic view illustrating the operation of the device.

Like characters designate corresponding parts throughout the several views.

The instrument forming the subject-matter of this application comprises a sight tube or casing 10, of any approved form, in cross section here shown as rectangular. The sight tube 10 is provided at one side with an off-set tube 11 of substantially the same form in cross section and disposed at right angles to the tube 10. The off-set tube 11 is provided with an object glass 12 secured in the extremity thereof in any approved manner as by means of the collars 13 and 14, the former of which is provided with a vertical wire 15.

At one end the sight tube 10 is provided with a sleeve 16 fitting snugly and removably therein and held by frictional engagement with the inner surface and forming, at its outer end, a shoulder or bearing for retaining the objective 17 in position, which said glass is held from displacement by a collar 18 or in any approved manner. The outer extremity of the sleeve 16 is provided with a vertical sight wire or cross-wire 19 and perpendicular, horizontal sight wire or cross-wire 20 crossing at the center of said sight glass in the usual well known manner. The inner end of the sleeve 16 is formed on an incline and with a reflector 21 coincident with said incline and extending only a part of the distance across the tube 10, stopping slightly short of the middle line, as indicated at Fig. 2.

Immediately above the center of the inclined reflector 21 an opening 22 is formed in the tube 10 and with a spirit level 23 disposed immediately above the said opening and secured in position in any approved manner, as by the cap 24. The cap 24 is provided with ears 25 at its opposite ends through which are projected slots 26 extending longitudinally of the cap and tube 10 and through which are extended screws 27 by which the cap 24 is secured upon the tube 10 and adjustable longitudinally thereof. The spirit level 23 is provided with a central circumferential mark 28 produced in any approved manner, preferably by scratching such mark into the external surface of the glass tube of said spirit level.

Into the end of the tube 10 opposite the sleeve 16 is inserted a slide 29 having at its external end a plate 30 proportioned to close the outer end of the tube 10 and provided with a sight piece 31 with the central sight opening 32, the said sight piece 31 being preferably knurled about its circumference for security in grasping when the slide 29 is to be withdrawn from the tube. The slide 29, like the sleeve 16, is proportioned to fit snugly within the tube 10 and to be retained therein by frictional engagement with the inner surface thereof. For clearness of illustration the slide 29 and sleeve 16 have been shown as slightly smaller than the inner extent of the tube 10, but in practice the said sleeve and slide will fit snugly against the end surface of the tube and be retained therein by such frictional contact. The slide 29 is provided with a plate 33 disposed parallel with the surface of the said slide 29, and providing a frictional surface for better engagement with the tube 10. The plate 33 and slide member 29 are spaced apart by means of a strip 34 disposed in a vertical position at one side of the slide and in such position as not to interfere with the line of vision from the sight opening 32.

Upon the slide 29 is mounted a plate 35 and adjustable thereon by means of a slot 36 engaged upon a lug 37 formed upon the slide 29 and by means of a slot 38 engaged by a binding screw 39. The adjustment of the plate 35 is accomplished by means of an eccentric screw 40, which screws into the slide 29, and the eccentric head is engaged within a transverse slot 41 formed in the plate 35.

Upon the plate 35 is secured a reflector 42 by means of a pivot screw 43, and an angular adjustment about the said pivot screw 43 secured by means of an eccentric screw 44, having its eccentric head engaged within a slot 45 formed in one end of the plate 46 to which the reflector is rigidly secured. The slide 29 is also provided at its inner end with a spirit level 47 secured in any approved manner as by the sleeve 48 and disposed transversely of the slide and normally in a horizontal position.

To permit of a greater angular adjustment of the angular reflector than can be accomplished by the device as shown in Figs. 2, 3 and 4, the reflector as shown at 42' may be mounted upon a segmental plate 46' and secured by means of a screw 43'. The plate 46' is provided with graduations about its periphery and a corresponding mark, as 49, provided upon the surface of the plate 35' so that the degree of angularity may be read at once from the plate 46'.

In use, the operator will look through the sight opening 32 and directly through the sight tube, and will see an object through the objective 17, its horizontal and vertical positions being determined by means of the usual wires 19 and 20. The horizontal position of the sight tube 10 is determined by means of the spirit level 23. The mark 28 formed circumferentially upon the spirit level 23 will appear upon the reflector 21 as a continuation of the horizontal wire 20, and is shown at 21' in Fig. 5. The cap 24 being provided with an opening in its upper surface which registers with the opening 22 in the surface of the tube 10 the usual bubble formed in the spirit level is reflected upon the reflector 21 so that when in the operation of the device the image of the bubble appears exactly upon the continuation of the horizontal wire 20, the tube 10 is in an exact horizontal position longitudinally. The horizontal position transversely is determined by the spirit level 47, the usual bubble of which is in position to be seen between the eye of the observer and the vertical wire 19, so that when the said bubble registers with the said wire 19 the tube is in a horizontal position transversely. It will thus be seen that by means of the two spirit levels and the angular reflector, the tube may be disposed in an exact level position. The angular reflector 42 is disposed normally at an angle of 45° to the longitudinal axis of the tube 10 and with its central point at the vertex of the right angle formed by the longitudinal axis of the tube 10, and the major axis of the off-set tube 11. It will thus be seen that the image of the vertical wire 15 in the off-set tube 11 is reflected from the angular reflector 42 as a continuation of the vertical wire 19, as shown at 19' in Fig. 5. It will thus be readily seen that when an object is visible to register with the vertical wire 19 as seen through the sight tube 10 any object which is reflected from the reflector 42 and registering with the wire 15, as at 19', is exactly at right angles to the longitudinal axis of the tube 10.

In projecting perpendicular lines, the sight tube 10 is adjusted to coincide with the given line and with the central point of the reflector 42 coinciding with the right angle to be formed by the perpendicular line. The tube is adjusted to an exact level in the manner described and the line vertical to the longitudinal axis of the tube is then determined by the wire 15 as any usual rod or similar device when seen to register with the said wire 15 is upon a line exactly perpendicular to the longitudinal axis of the tube. In laying out or running perpendicular lines it will thus be seen that a line may be determined by placing the instrument at the desired angle and locating it by means of the usual rod erected upon the known line. The perpendicular line is then determined, as described, by the usual rod and rodman, the said rod being moved until its image appears upon the reflector 42 to coincide with the wire 15.

To project a line at an angle other than 90° from the known line, the angularity of the reflector 42 is changed. In Fig. 7 is shown diagrammatically, the manipulation of the reflector for such purpose. The line A—B is the longitudinal or major axis of the tube 10, and the usual line of vision extending from the sight opening 32 to the vertical wire 19. The normal position of the reflector 42 is shown by the line C—D and the position of the vertical wire 15 by the point E. The vertical line is then determined by the point E and the point F, the center of the reflector, such perpendicular line being F—G.

When it is desired to project a line at an angle to the line A—B other than the angle of 90°, represented by the line F—G, the reflector 42 is moved longitudinally of the tube 10 by means of the eccentric screw 40 and determined by the scale appearing upon the lug 37 and the plate 35. The new position of the reflector 42 is shown in Fig. 7 as C'—D', and the perpendicular determined by the central position of the said reflector will then show as F'—G', which line is parallel with the line F—G. The line F'—G', however, does not pass through the point E or the wire 15. As the wire 15 is necessary in determining the exact location of the object used to determine the line the reflector 42 must be rotated upon its pivot until the vertical wire 15 appears on the reflector 42 in line with the vertical wire 19, so that the said reflector will occupy the position C''—D''. It being known at what angle the projected line is to occupy relative to the known line, the reflector is adjusted angularly, as before described, to occupy the position as shown in Fig. 7, such angular adjustment being determined by the scale shown upon the plate 35 and the reflector being moved angularly until the wire 15 will appear on the reflector 42 in line with the vertical wire 19. The line of vision projected through the sight opening 32 will then encounter the reflector 42 and the rod or other object will be seen thereon exactly in the position described by its location in projecting the perpendicular line, but in that case the rod will be positioned at the predetermined angle.

In the device shown in Fig. 6 the angular position of the reflector 42' may be read directly from the segmental plate so that by properly designating the graduations, the plate 35' and the plate 46' may be adjusted and secured at their proper adjustments when the slide 29 is removed from the tube.

In use, the operator simply holds the instrument to his eye by hand, or, if desired, it may be quickly adjusted to a tripod or jackstaff, and looks through the eye opening 32 and the object glass 17, at a predetermined point in front, the angular reflector 42 reflecting the objects at right-angles with the predetermined line directly in front of the operator, the side auxiliary wire 15 appearing in the reflector as 19' a continuation of the primary, vertical wire 19. When the object at the side, shown in the reflector 42, appears directly in line with the vertical, primary wire 19, that point is directly at right-angles with the determined line in front of the operator. The horizontal wire 20 extends across the aperture in line with the reflected line under the upper level 23, thus aiding in determining an elevation, or in reading figures from the level rod in front. This instrument takes the place of both the common hand level and a triangle, as the wires crossing will always be on a level with the point ahead, and level if the bubble 23 reflected is kept on the line, regardless of the position of the instrument, thus, the point at right-angles can be determined, even if higher or lower than the straight line being produced.

The lower level 47 is arranged for the purpose of producing lines ahead. It is the bubble which determines the horizontal position of the device, and in that position, the vertical wire serves as a guide for erecting a rod perpendicularly at a distance. The instrument, together with a chain or a measuring appliance will readily enable the operator to determine points on any angle desired within an imaginary square. It is particularly useful in platting a tract of land into any size squares desired or in blocks, the operator, moving along a determined line, sights ahead and at the side at the desired angle while the chainmen drive stakes along each line simultaneously.

This instrument is likewise very useful in finding the radial lines of a circle or an arc, the circle having been first established. Two or more points are located upon the circumference of a predetermined circle or arc. The center of a straight line connecting two of these points is determined by locating the instrument at one point and sighting forward to the other. After the center of the straight line connecting the two points has been located, the instrument is located at this point and the operator then sights forward or backward to one of the curve points determining the straight line, and the line determined by the off-set tube, which line is at right-angles to the line determined by the two points, will then be a radial line passing through the center of the circle. The chainmen can then stake along this radial line, and the exact topography of the land within the circle is readily determined. The cross wires also perform the special function of determining the true axis of the instrument and by aid of the bubble of level 23, the instrument can be tipped sidewise to any degree to permit of the establishment of points on a different elevation.

What I claim is:—

1. In a device of the class described, a sight tube provided with a sight opening at one end, and an objective at the opposite end, an off-set tube extending from the sight tube intermediate its ends, a reflector disposed within the sight tube, and at an angle to reflect through the sight opening a ray of light projected through the off-set tube, and means carried by the tube for determining the longitudinal and transverse horizontal position of the sight tube.

2. In a device of the class described, a sight tube, a plate disposed within the said tube and movable longitudinally thereof, and provided with a slot, an eccentric screw engaged within the slot and arranged to move the plate as the screw is moved rotatably, means to secure the plate at its adjusted position, and a reflector carried by the plate.

3. In a device of the class described, a sight tube, a plate disposed within the sight tube, and movable longitudinally relative thereto, a reflector pivoted upon and movable with the plate, and means for moving the reflector angularly upon its movable pivot.

4. In a device of the class described, a sight tube provided with an off-set tube, a plate disposed within and movable longitudinally of the sight tube, a reflector pivotally mounted upon the plate and disposed normally to register with the off-set tube, and means to move the reflector angularly upon the pivot.

5. In a device of the class described, a sight tube provided with an off-set tube, a reflector pivotally mounted within the tube, and registering with the off-set tube, a plate arranged to support the reflector and provided with a slot, and an eccentric screw disposed within the slot and arranged to move the plate angularly upon being rotated.

6. In a device of the class described, a sight tube provided with a sight opening at one end, and an object opening at the opposite end, a horizontal and a vertical sight wire spanning the object opening, a tube off set from one side of the sight tube intermediate its ends, and provided with an object opening, a vertical sight wire spanning the object opening of the off-set tube, a spirit level secured to the sight tube adjacent the object end, and provided with a circumferential mark, a reflector secured within the sight tube, and at an angle to reflect to the sight opening the circumferential mark of the spirit level as a continuation of the horizontal sight wire of the object opening, a spirit level disposed within and transversely of the sight tube and in such position that when the tube is horizontal transversely the bubble of the level is in alinement between the vertical sight wire of the object opening and the sight opening, a reflector disposed in position to reflect to the sight opening, the image of the vertical sight wire of the off-set tube as a continuation of the vertical sight wire of the object opening of the sight tube, means to move the last-named reflector longitudinally of the sight tube, and means for moving the last-named reflector angularly relative to the axis of the sight tube.

In testimony whereof I affix my signature in presence of two witnesses.

WALTER THORBURN.

Witnesses:
 G. WARD KEMP,
 MARK WHELAN.